March 28, 1950 — R. P. PORTER — 2,502,276
AUTOMATIC WINDROW TRIP FOR SELF-DUMP RAKES
Filed Dec. 19, 1947 — 2 Sheets-Sheet 1
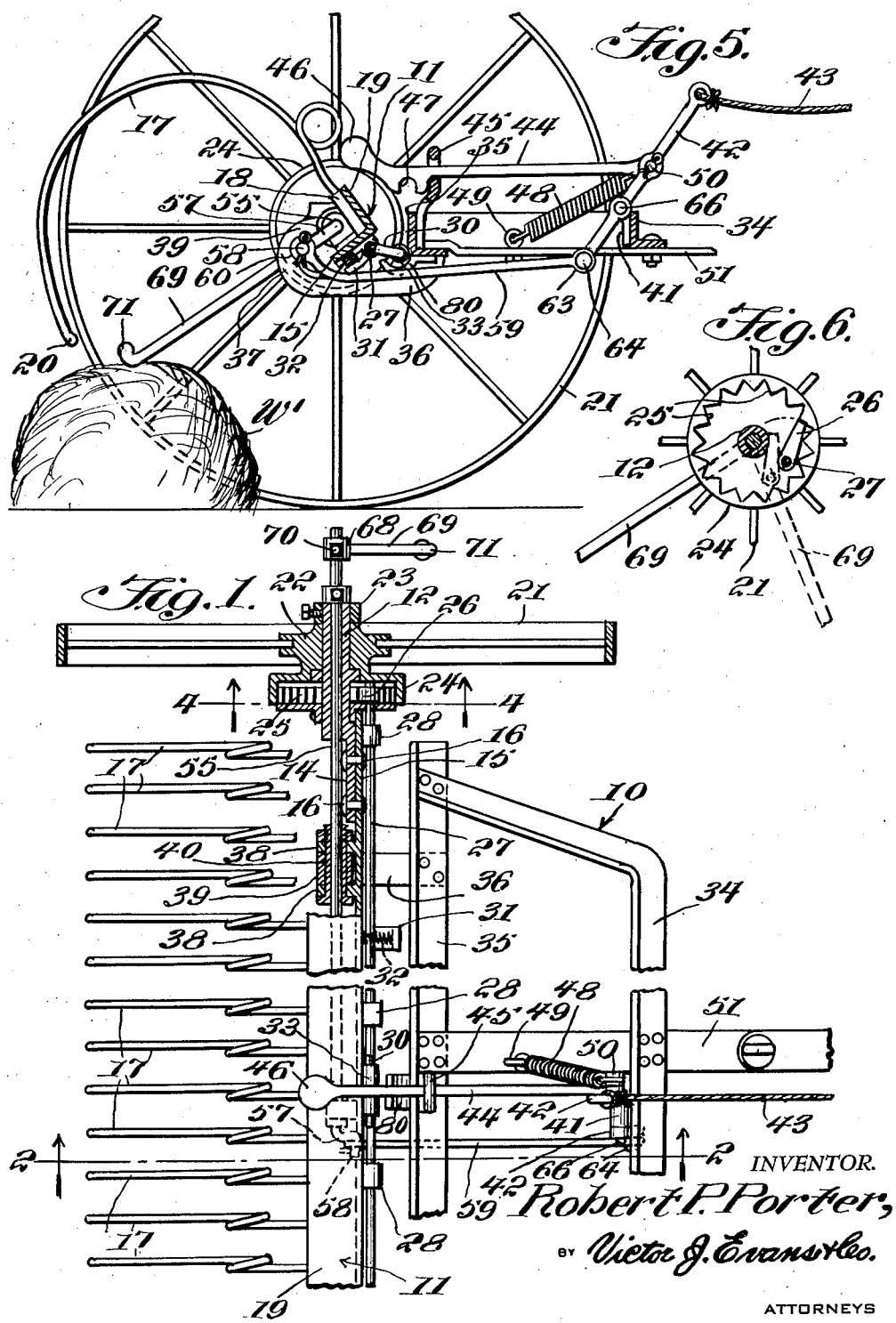

March 28, 1950     R. P. PORTER     2,502,276
AUTOMATIC WINDROW TRIP FOR SELF-DUMP RAKES
Filed Dec. 19, 1947     2 Sheets-Sheet 2
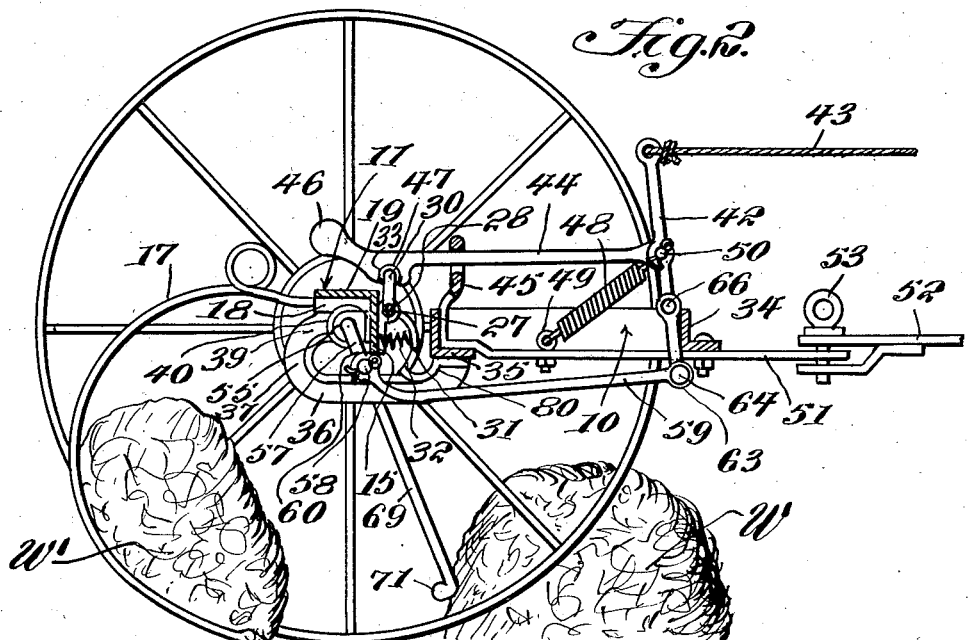
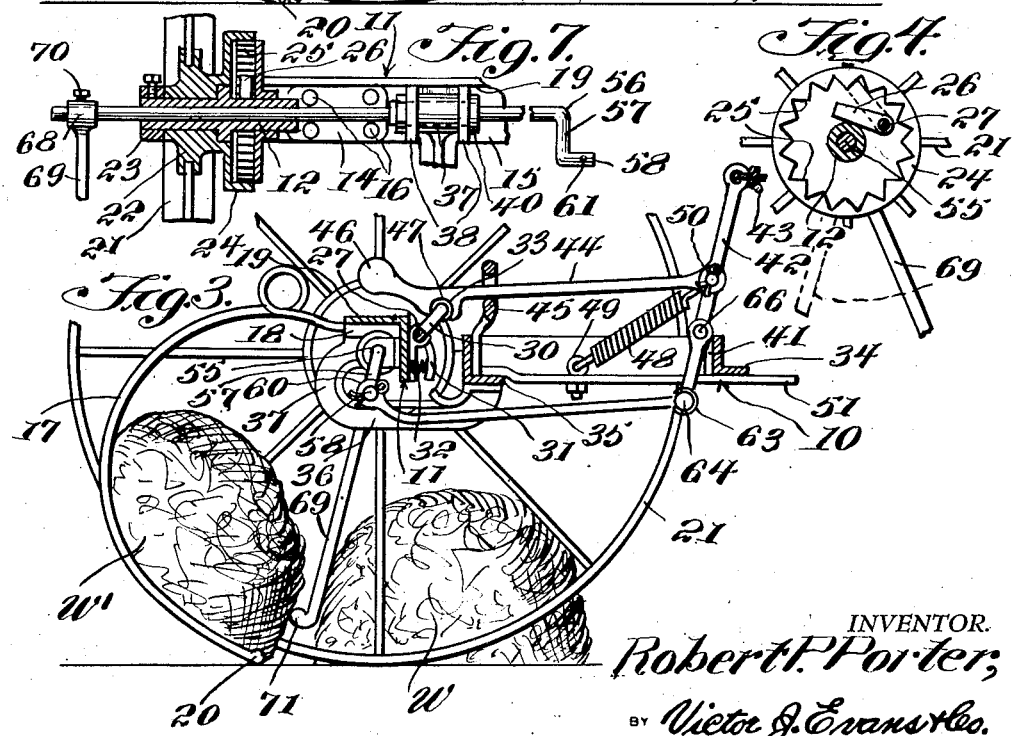
INVENTOR.
Robert P. Porter,
BY Victor J. Evans & Co.
ATTORNEYS Patented Mar. 28, 1950

2,502,276

UNITED STATES PATENT OFFICE 2,502,276

AUTOMATIC WINDROW TRIP FOR SELF-DUMP RAKES

Robert P. Porter, Pierre, S. Dak.

Application December 19, 1947, Serial No. 792,718

1 Claim. (Cl. 56—393)

The present invention relates to hay rake attachments, and in particular to an automatic tripping device for self dumping rakes.

One object of the invention is to provide an attachment for a self dumping hay rake which will automatically dump the rake when the tripping attachment engages a previously raked and dumped hay windrow, so that the rake will dump its hay load in a location on a continuation of the windrow.

Another object is to provide an attachment for conventional hay rakes which can be easily applied and which will be effective to dump the load of the hay rake when said rake is manipulated to bring the load abreast of a previously dumped load or windrow.

Another object is to provide an attachment for self dumping hay rakes which will trip the rake at a predetermined location when the attachment engages a previously dumped rake load on the ground.

Another object is to provide a tripping attachment for self dumping hay rakes which will not engage the ground during the travel of the rake on the ground surface, but will be effective to trip the hay rake when brought into engagement with a previously dumped hay load or windrow.

Other objects and advantages of the invention will become apparent during the course of the following description wherein—

Figure 1 is a fragmentary top elevational view of a conventional hay rake, showing the manner in which the device embodying the invention is applied thereto.

Figure 2 is a vertical cross-sectional view taken on line 2—2 of Figure 1 and looking in the direction of the arrows to illustrate various details of assembly and installation of the attachment, and showing the attachment in windrow engaging position.

Figure 3 is a vertical cross-sectional view similar to Figure 2, showing the tripping attachment in a position immediately after the same has engaged the windrow and prior to tripping of the rake dumping mechanism.

Figure 4 is a vertical cross-sectional view taken on line 4—4 of Figure 1, looking in the direction of the arrows, and showing the trip dog and windrow engaging arm in full lines coinciding with the positions thereof shown in Figures 1 and 2, and in dotted lines to coincide with the position shown in Figure 3.

Figure 5 is a vertical cross-sectional view similar to Figures 2 and 3, showing the position of the tripping attachment when the rake is dumped by the traction operated dumping mechanism.

Figure 6 is a vertical cross-sectional view similar to Figure 4, showing the windrow engaging arm and the trip dog in full lines as in Figure 5, and in dotted lines after the trip dog has been released, and Figure 7 is a fragmentary horizontal sectional view of the hay rake dumping mechanism showing the tripping attachment in side elevation.

Referring to the drawings in detail, there is shown a conventional self dumping hay rake generally designated 10. For convenience of illustration, the hay rake includes a tilting frame bar 11 of angle section to the ends of which is affixed tubular axles 12 having co-extensive flanged portions 14, which are adapted to be attached to the flange 15 of the frame bar 11 by rivets or the like as at 16. Curved rake tines 17 have their ends received in bosses 18 on the other flange 19 of the tilting frame bar 11, and the free ends of the rake tines 17 terminate in ground engaging teeth 20.

Wheels 21 have their hubs 22 rotatably mounted on the tubular axis 12, and a retaining collar is held in place by a set screw to prevent axial displacement of the wheels. Formed integral with the hub 22 of each wheel is a drum 24, having a series of internal teeth 25 and said teeth are adapted to be engaged by a pawl 26 on each end of a control rod 27. The control rod 27 is journaled in suitable bearings 28 affixed to the flange 15 of the angle frame bar 11 in spaced apart relation. Secured to the intermediate portion of the shaft 27 is a crank arm 30 on which is mounted a roller 33. Said roller connecting the inner crank portions of the control rods 27 in the usual manner. Also secured to the control shaft 27 is an arm 31 which is engaged by a coil spring 32 to urge the shaft 27 in a clockwise direction, and keep the pawl 26 disengaged from the teeth 25 of the drum 24.

A draft frame of angle bar construction is indicated as at 34, and includes a rear draft bar 35 having spaced extensions 36, the rear free ends of which are curved as at 37 for pivotal connection between spaced lugs or hinge projections 38 formed integral with the flange 15 of the angle iron frame 11.

The extreme free end of each projection 36 terminates in a hinge loop 39 having hinge pintle receiving openings adapted to align with pintle receiving openings in the lugs 38. One of said hinge pintles being shown as of tubular construction designated 40. The hinge axis of the tubular hinge pintle 40 is aligned with the axis of the wheels 21 to facilitate rocking or tilting of the angle bar frame 11 about said axis when the rake tines 17 are moved out of and into ground engaging position.

Secured to the draft frame 34 is a bracket 41 to which is pivoted a control lever 42 by means of a pivot pin 66. A flexible control cable or the like as at 43 is fastened to the upper end of the control lever for operation of said lever from a convenient position on the tractor. The intermediate portion of the lever 42 has pivoted thereto a rearwardly extending rod 44 by means of a pivot pin 50, and said rod is guided in the opening of a bracket 45 affixed to the frame so as to be positioned above the tilting frame bar 11. The free end of the rod 44 is weighted as at 46, and a notch 47 is formed in the under edge of said lever for normally receiving the crank arm 30. A coil spring 48 has one end attached to the draft frame as at 49, and the other end attached to the pivot pin 50 of the control rod 44 and pivoted lever 42.

A draft bar 51 is affixed to the draft frame 34, and may be attached to a draw bar 52 on a tractor or the like by means of a coupling pin 53. The angular portion of the frame bar 34 forms a stop for the lever 42.

The above structure is typical of a conventional self dumping hay rake, and is merely shown and described for the purpose of illustrating the manner in which the device of the present invention is used. The invention consists in providing a rod 55 which is adapted to extend through one of the tubular axles 12 and the tubular hinge pintle 40 on either the right or left hand side of the self dumping hay rake in the manner as illustrated in Figures 1 and 7. The inner end of the rod 55 is bent as at 56 to provide a crank arm 57 on the free end of which is provided a crank pin 58. The crank pin 58 has pivotally secured thereto one end of a lever 59 having a bearing boss 60 which is held on the crank pin 58 by means of a cotter key or the like being passed through an opening 61. The forward end of the lever 59 is pivotally connected to the operating lever 42 by having its bearing boss 63 pivotally connected thereto by means of a pivot pin 64. Thus, when the lever 42 is rocked about its pivot pin 66, the rod 55 will be angularly displaced about its axis independently of the hay rake frame. Similarly, rocking movement or angular displacement of the tripping rod 55 will cause the tripping lever 42 to be rocked about its pivot point 66.

The outer end of the tripping rod 55 projects a considerable distance beyond the wheel 21, and has affixed thereto the collar 68 of a depending windrow engaging arm 69. The collar 68 is adjustably secured to the outer end of the tripping rod 55 by means of a set screw 70, and the windrow engaging rod 69 is enlarged as at 71 to provide a windrow engaging head portion which terminates in spaced relation from the ground so that the windrow engaging lever 69 will not be operated when striking stones or other objects projecting slightly above the ground level, and will only be operated when the hay rake is brought abreast of a previously dumped hay load.

In the operation of the invention, the hay rake is connected in draft relationship with the draw bar 52 of the tractor by means of the coupling pin 53, and the hay rake tines 17 will be positioned as shown in Figure 2 for raking the hay on a field or the like. In this position, the crank 30 will be positioned in engagement with the notch 47 of the sliding rod 44 so as to retain the pivoted pawl 26 out of engagement with the internal teeth 25 of the drum 24, as shown best in Figure 4. With the parts in this position, the hay rake may be drawn forward and the tines 17 will rake the hay or other material being gathered so that the driver of the tractor can rake the load to a predetermined spot or location and then exert a pull on the flexible control cable 43 from a position adjacent the driver's seat of the tractor. This operation will cause the pawl 26 to move into engagement with the teeth 25 of the drum 24, and thereby lock the supporting wheels 21 to the tilting frame 11, whereupon continued forward travel of the hay rake will cause the tines 17 to be raised. When the tilting frame 11 has been rocked about its pivot axis a predetermined angular distance, the crank 30 will engage a stop projection 80 attached to the draft frame 10 and cause the pawl 26 to be disengaged from the teeth 25 of the drum 24. When this occurs, the hay rake will swing to its normal raking position, and the roller 33 will again be received in the notch 47 of the sliding operating rod 44.

The above description of operation is typical of a conventional hay rake, and the invention is intended to trip the hay rake after the first hay load or windrow has been dumped by means of the above described manual control.

In the drawings, the reference character W will roughly indicate a previously dumped hay load or windrow collected and dumped in the above manner on the ground. In the next raking cycle, the hay rake parts are in the position shown in Figure 2 and as the hay rake is brought abreast of the previously dumped hay load or windrow W, the windrow engaging head 71 will engage said load and cause the control shaft 55 to be rocked about its axis as shown in Figure 7. When this occurs, the rod 59 is moved rearwardly to thereby rock the pivoted lever 42 about its pivot point 66 and move the sliding rod 44 forward so as to rock the crank 30 about its pivot pin axis, and similarly rock the rod 27 about its axis in a clockwise direction and project the pawl 26 into engagement with the teeth 25 of the drum 24. When this occurs, the wheels 21 will be locked to the frame 11 so as to cause the vertical swinging movement of the tines 17 and the dumping of a rake load W' adjacent the previously dumped load W to form a windrow. After the tilting frame 11 has rocked about its axis, the roller 33 will engage the stop 80 and release the pawl 26 from engagement with the teeth 25 of the drum 24, so that the hay rake tines 17 may fall by gravity to a raking position. Figure 5 shows the hay rake and tripping lever 69 being initially dumped by operation of the tripping lever 69 with the windrow W at the moment when the rake is dumped and the roller 33 is about to engage the stop 80 to release the pawl 26 as above described. Thus, it will be seen that the manual control means and the windrow engaging tripping means will operate independently so as to facilitate the dumping of the first load manually, and the remaining loads automatically.

What I claim is:

In combination with a draft rake having a wheel supported tilting rake frame, tubular axles carried by said frame, supporting wheels mounted on said tubular axles and a manually controlled clutch for clutching the wheels to said frame for swinging the rake to a dumping position; an automatic windrow operated mechanism for rendering said clutch effective comprising a rod rotatably mounted on the rake frame having a portion projecting through one of said tubular axles and one of the hubs of said supporting wheels, means carried by said rake frame to rotatably receive and support said rod inwardly of said tubular axle a depending arm on the outer end of said rod having its lower end extending at right angles to the rod to form an enlargement on the lower end of said rod and said enlargement terminating in spaced relation to the ground surface and adapted to engage a windrow for swinging said arm about the axis of said rod, and a crank arm on the other end of the rod connected to the manual control linkage of said clutch whereby engagement of said arm with a windrow will operate the clutch and cause the wheels to be clutched to the frame and rotated therewith to swing the rake to a dumping position.

ROBERT P. PORTER.

REFERENCES CITED

The following references are of record in the file of this patent:

UNITED STATES PATENTS

| Number | Name | Date |
|---|---|---|
| 860,380 | Hogen | July 16, 1907 |
| 1,055,466 | Johanson | Mar. 11, 1913 |
| 1,900,270 | Altgelt | Mar. 7, 1933 |
| 2,165,110 | McAfee | July 4, 1939 |